(12) United States Patent
Su

(10) Patent No.: US 11,968,532 B2
(45) Date of Patent: Apr. 23, 2024

(54) METHOD AND APPARATUS FOR CONNECTING TO WIRELESS ACCESS POINT

(71) Applicant: SHANGHAI LIANSHANG NETWORK TECHNOLOGY CO., LTD., Shanghai (CN)

(72) Inventor: Yong Su, Shanghai (CN)

(73) Assignee: SHANGHAI LIANSHANG NETWORK TECHNOLOGY CO., LTD., Shanghai (CN)

(*) Notice: Subject to any disclaimer, the term of this patent is extended or adjusted under 35 U.S.C. 154(b) by 793 days.

(21) Appl. No.: 17/074,591

(22) Filed: Oct. 19, 2020

(65) Prior Publication Data

US 2021/0058788 A1 Feb. 25, 2021

Related U.S. Application Data

(63) Continuation of application No. PCT/CN2018/124519, filed on Dec. 27, 2018.

(30) Foreign Application Priority Data

Apr. 17, 2018 (CN) .......................... 201810343734.8
May 10, 2018 (CN) .......................... 201810440387.0

(51) Int. Cl.
*H04W 12/08* (2021.01)
*G06Q 20/32* (2012.01)
*H04W 48/08* (2009.01)

(52) U.S. Cl.
CPC .......... *H04W 12/08* (2013.01); *G06Q 20/325* (2013.01); *H04W 48/08* (2013.01)

(58) Field of Classification Search
None
See application file for complete search history.

(56) References Cited

U.S. PATENT DOCUMENTS

2002/0008633 A1* 1/2002 Heller .................. G06K 7/0008
340/9.17
2002/0196802 A1* 12/2002 Sakov ................. H04L 12/2881
370/392

(Continued)

FOREIGN PATENT DOCUMENTS

CN 104113934 A 10/2014
CN 104363631 A 2/2015

(Continued)

OTHER PUBLICATIONS

Chuan Lu, GehuaChain gives you a different "mining" experience, Computer and Network, 2018, p. 73.

*Primary Examiner* — William J. Goodchild
(74) *Attorney, Agent, or Firm* — Bayramoglu Law Offices LLC

(57) ABSTRACT

Embodiments of the present application disclose a method and a device for connecting to a wireless access point. A specific implementation of the method includes: receiving a request for connecting to a wireless access point sent by a terminal device; sending an address of a router to the terminal device, in which the router is a node in a blockchain, and the address of the router is an address of the node to which the router in the blockchain belongs; receiving verification information sent by the terminal device to the address of the router; generating a verification result based on the verification information; and if the verification result indicates that verification is successful, granting the terminal device a permission to connect to the wireless access point. The implementation provides a new method for connecting to a wireless access point, thereby enriching methods for connecting to a wireless access point.

14 Claims, 7 Drawing Sheets

(56) References Cited

U.S. PATENT DOCUMENTS

| | | | |
|---|---|---|---|
| 2003/0087629 A1* | 5/2003 | Juitt | H04W 12/068 455/411 |
| 2003/0090998 A1* | 5/2003 | Lee | H04L 63/0869 370/229 |
| 2015/0143473 A1 | 5/2015 | Jung et al. | |
| 2016/0294828 A1 | 10/2016 | Zakaria | |
| 2018/0158034 A1* | 6/2018 | Hunt | G06Q 20/00 |
| 2019/0089155 A1* | 3/2019 | Cui | G05F 1/66 |

FOREIGN PATENT DOCUMENTS

| | | |
|---|---|---|
| CN | 105530633 A | 4/2016 |
| CN | 106452785 A | 2/2017 |
| CN | 106921970 A | 7/2017 |
| CN | 107148019 A | 9/2017 |
| CN | 107392769 A | 11/2017 |

* cited by examiner

METHOD AND APPARATUS FOR CONNECTING TO WIRELESS ACCESS POINT

CROSS REFERENCE TO THE RELATED APPLICATIONS

This application is a continuation application of International Application No. PCT/CN2018/124519, filed on Dec. 27, 2018, which is based upon and claims priority to Chinese Patent Application No. 201810440387.0, filed on May 10, 2018, and Chinese Patent Application No. 201810343734.8, filed on Apr. 17, 2018, the entire contents of which are incorporated herein by reference.

TECHNICAL FIELD

Embodiments of the present application relate to the field of wireless communication technologies, and specifically to a method and device for connecting to a wireless access point.

BACKGROUND

With the continuous development of wireless communication technologies, the wireless-fidelity (WI-FI) network has become an important way for users to access the network daily, and it has also brought great convenience to users.

Currently, there are three main ways for users to connect to a wireless access point. First, for a password-free wireless access point, a terminal device can directly connect to the wireless access point; second, for an encrypted wireless access point, a user enters a password of the wireless access point, and if the password entered by the user is verified to be correct by a router, the terminal device can connect to the wireless access point; and third, for a web authentication wireless access point, a user enters a mobile phone number and a verification code, and after the identity of the user is authenticated by a router, the terminal device can connect to the wireless access point.

SUMMARY

Embodiments of the present application provide a method and device for connecting to a wireless access point.

According to a first aspect, embodiments of the present application provide a method for connecting to a wireless access point. The method is applied to a router, including: receiving a request for connecting to a wireless access point sent by a terminal device; sending an address of a router to the terminal device, the router being a node in a blockchain, and the address of the router being an address of the node to which the router in the blockchain belongs; receiving verification information sent by the terminal device to the address of the router; generating a verification result based on the verification information; and if the verification result indicates that verification is successful, granting the terminal device a permission to connect to the wireless access point.

In some embodiments, the verification information includes a to-be-verified private key signature; and the generating a verification result based on the verification information includes: decrypting, with a public key, the to-be-verified private key signature to obtain a decryption result; and generating the verification result based on the decryption result.

In some embodiments, the verification information further includes pending payment information; and the generating the verification result based on the decryption result includes: if the decryption result includes an address of the terminal device, verifying the pending payment information by using preset to-be-received information, to generate the verification result.

In some embodiments, the generating a verification result based on the verification information includes: verifying the verification information, to obtain a first verification result; if the first verification result indicates that the verification is successful, broadcasting the verification information to other nodes in the blockchain; receiving confirmation information sent by at least some of the other nodes in the blockchain; and generating the verification result according to a quantity of received confirmation information, where if the quantity of the received confirmation information exceeds a preset quantity, the verification result indicates that the verification is successful, and if the quantity of the received confirmation information does not exceed the preset quantity, the verification result indicates that the verification fails.

In some embodiments, the generating a verification result based on the verification information includes: verifying the verification information, to obtain a first verification result; if the first verification result indicates that the verification is successful, sending the verification information to neighbor nodes of the router; receiving confirmation information sent by at least some of the neighbor nodes of the router; and generating the verification result according to a quantity of received confirmation information, where if the quantity of the received confirmation information exceeds a preset quantity, the verification result indicates that the verification is successful, and if the quantity of the received confirmation information does not exceed the preset quantity, the verification result indicates that the verification fails.

In some embodiments, the verification information further includes payment data; and before the granting the terminal device a permission to connect to the wireless access point, the method further includes: writing the payment data, and synchronizing the payment data to the other nodes in the blockchain.

In some embodiments, the wireless access point is a web authentication wireless access point.

According to a second aspect, an embodiment of the present application provides a method for connecting to a wireless access point, applied to a terminal device, the method including: sending a request for connecting to a wireless access point to a router; obtaining an address of the router, the router being a node in a blockchain, and the address of the router being an address of the node to which the router in the blockchain belongs; sending verification information to the address of the router; and if a permission to connect to the wireless access point granted by the router is obtained, connecting to the wireless access point.

In some embodiments, the obtaining an address of the router includes: obtaining the address of the router by remotely calling a service interface.

In some embodiments, the verification information includes a to-be-verified private key signature; and after the obtaining an address of the router, the method further includes: displaying a payment page including the address of the router; and the sending verification information to the address of the router includes: in response to receiving a confirmation operation on the payment page including the address of the router, sending the verification information including the to-be-verified private key signature to the address of the router.

In some embodiments, the verification information further includes pending payment information; and during the obtaining of the address of the router, the method further includes: obtaining preset to-be-received information from the router; the displaying a payment page including the address of the router includes: displaying the payment page including the address of the router and the to-be-received information; and the sending verification information to the address of the router includes: in response to receiving a confirmation operation on the payment page including the address of the router and the to-be-received information, sending the verification information including the to-be-verified private key signature and the pending payment information to the address of the router.

In some embodiments, the verification information further includes payment data; and the sending verification information to the address of the router includes: in response to receiving the confirmation operation on the payment page including the address of the router and the to-be-received information, sending the verification information including the to-be-verified private key signature, the pending payment information, and the payment data to the address of the router.

In some embodiments, the wireless access point is a web authentication wireless access point.

According to a third aspect, an embodiment of the present application provides a method for connecting to a wireless access point, including: sending, by a terminal device, a request for connecting to a wireless access point to a router, obtaining an address of the router, and sending verification information to the address of the router, the router being a node in a blockchain, and the address of the router being an address of the node to which the router in the blockchain belongs; receiving, by the router, the verification information sent by the terminal device to the address of the router, generating a verification result based on the verification information; and if the verification result indicates that the verification is successful, granting the terminal device a permission to connect to the wireless access point; and connecting, by the terminal device, to the wireless access point.

According to a fourth aspect, an embodiment of the present application provides a router, including: one or more processors; and a storage apparatus, configured to store one or more programs; the one or more programs, when executed by the one or more processors, causing the one or more processors to implement the method according to any one of the implementations in the first aspect.

According to a fifth aspect, an embodiment of the present application provides a terminal device, including: one or more processors; and a storage apparatus, configured to store one or more programs; the one or more programs, when executed by the one or more processors, causing the one or more processors to implement the method according to any one of the implementations in the second aspect.

According to a sixth aspect, an embodiment of the present application provides a computer-readable medium storing a computer program, and the computer program, when executed by a processor, implementing the method according to any one of the implementations in the first aspect or in the second aspect.

The embodiments of the present application provide a method and device for connecting to a wireless access point. A router is a node in a blockchain. Therefore, after a request for connecting to a wireless access point sent by a terminal device is received, an address of a node to which the router in the blockchain belongs is sent to the terminal device; then, verification information sent by the terminal device to the address of the node to which the router in the blockchain belongs is received; next, a verification result is generated based on the verification information; and if the verification result indicates that the verification is successful, the terminal device is granted a permission to connect to the wireless access point, so that the terminal device can successfully connect to the wireless access point. A router is used as a node in a blockchain to verify verification information in the blockchain, and whether to grant a terminal device a permission to connect to a wireless access point is determined according to a verification result, so that a new method for connecting to a wireless access point is provided, enriching methods for connecting to a wireless access point.

BRIEF DESCRIPTION OF THE DRAWINGS

By reading a detailed description of non-limiting embodiments with reference to the following drawings, other features, objectives, and advantages of the present application will become more apparent.

DETAILED DESCRIPTION OF THE EMBODIMENTS

Figure 1:
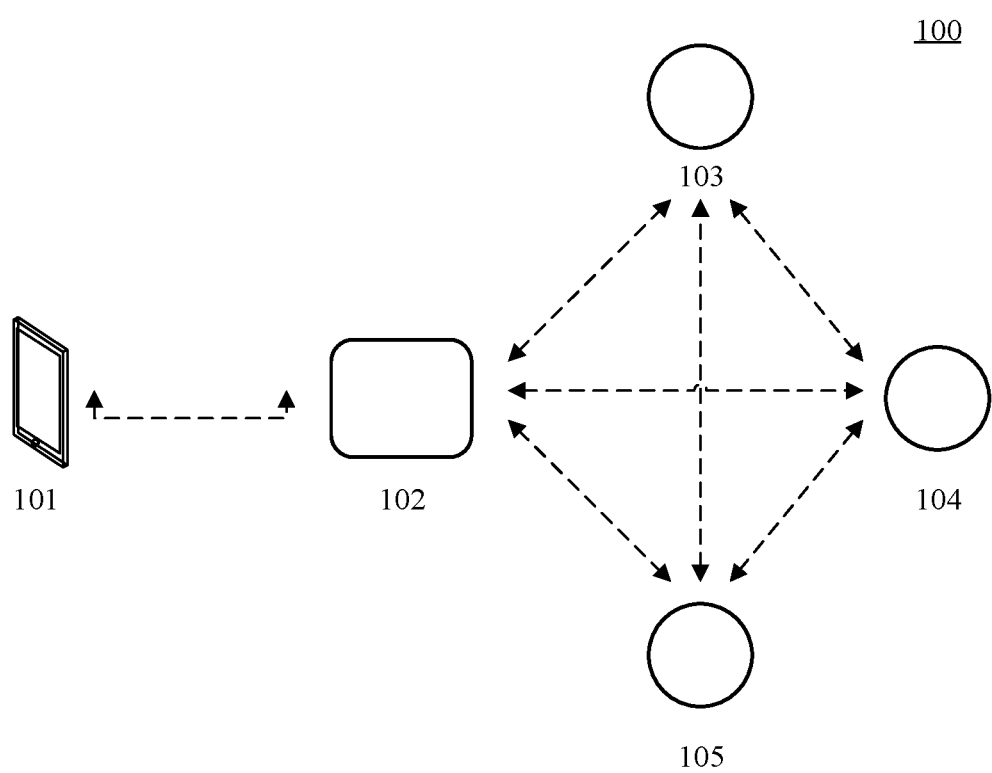
FIG. 1 is an exemplary system architectural diagram to which the present application can be applied.

The present application is further described below with reference to the accompanying drawings and embodiments. It can be understood that specific embodiments described herein are only used to explain a related invention, but not to limit the invention. In addition, it should also be noted that for ease of description, only parts related to the relevant invention are shown in the drawings.

It should be noted that the embodiments in the present application and features in the embodiments can be combined with each other if there is no conflict. Hereinafter, the present application will be described in detail with reference to the drawings and embodiments.

FIG. 1 shows an exemplary system architecture 100 to which an embodiment of a method for connecting a wireless access point of the present application can be applied.

As shown in FIG. 1, the system architecture 100 may include a terminal device 101 and a router 102. The router 102 may be a node in a blockchain, and may establish a connection to other nodes 103, 104, and 105 in the blockchain.

A user may interact with the router 102 by using the terminal device 101, to receive or send a message and the like. Various communication client applications, such as a wireless access point connection application, a search application, and the like may be installed on the terminal device 101.

The terminal device 101 may be hardware or software. When the terminal device 101 is hardware, it may be various electronic devices that support a connection to the wireless access point, including but not limited to a smartphone, a tablet computer, a laptop computer, a desktop computer, or the like. When the terminal device 101 is software, it may be installed in the foregoing listed electronic devices. The terminal device 101 may be implemented as a plurality of pieces of software or software modules, or as a single piece of software or software module. This is not specifically limited herein.

The router 102 may provide various services. For example, the router 102 may process, for example, analyze data such as a request for connecting to the wireless access point received from the terminal device 101, and determine, according to a processing result, whether to grant the terminal device 101 a permission to connect to the wireless access point.

It should be noted that the router 102 may be hardware or software. When the router 102 is hardware, it may be implemented as a distributed router cluster composed of a plurality of routers, or as a single router. When the router 102 is software, it may be implemented as a plurality of pieces of software or software modules (for example, configured to provide distributed services), or may be implemented as a single piece of software or software module. This is not specifically limited herein.

It should be noted that the method for connecting to a wireless access point provided in the embodiments of the present application may be performed by the router 102 or the terminal device 101.

It should be understood that the quantities of the terminal devices, the routers, and other nodes in the blockchain in FIG. 1 are merely exemplary. According to an implementation requirement, there may be any quantity of terminal devices, routers, and other nodes in the blockchain.

Figure 2:
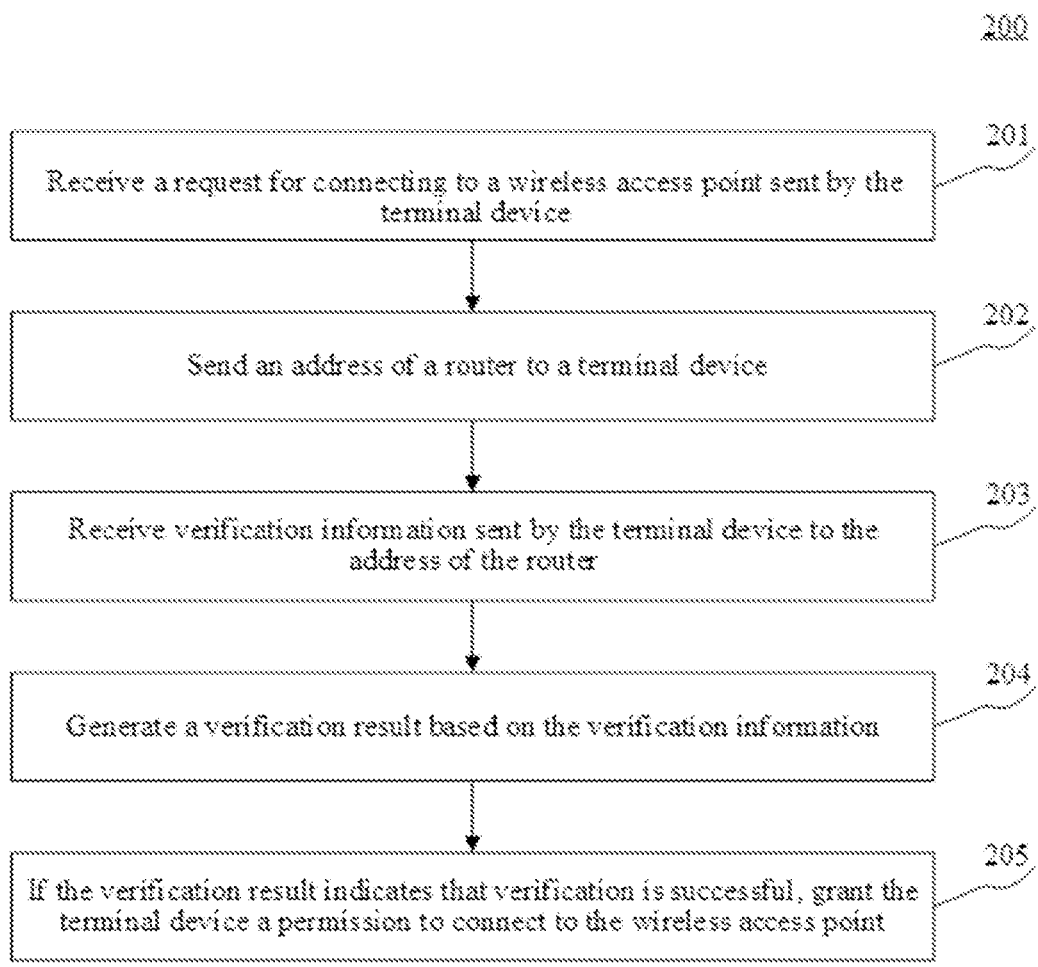
FIG. 2 is a flowchart of an embodiment of a method for connecting to a wireless access point according to the present application.

FIG. 2 shows a process 200 of an embodiment of a method for connecting to a wireless access point according to the present application. The method for connecting to a wireless access point is applied to a router and includes the following steps.

Step 201. Receive a request for connecting to a wireless access point sent by a terminal device.

In this embodiment, the router (for example, the router 102 shown in FIG. 1) on which the method for connecting to a wireless access point runs may receive the request for connecting to a wireless access point sent by the terminal device (for example, the terminal device 101 shown in FIG. 1).

In practice, when a user opens a wireless local area networks (WLAN) option in the settings of the terminal device or runs a wireless access point connection application installed on the terminal device, a screen interface of the terminal device may display a list of wireless access points near the terminal device. When the user clicks/taps a wireless access point in the list, the terminal device may be triggered to send a request for connecting to the wireless access point to the router.

Step 202. Send an address of the router to the terminal device.

In this embodiment, the router may send the address of the router to the terminal device. The router may be a node in a blockchain, and the address of the router is actually an address of a node to which the router in the blockchain belongs.

Step 203. Receive verification information sent by the terminal device to the address of the router.

In this embodiment, the terminal device may send the verification information to the address of the router, so that the router receives the verification information. Generally, the verification information is information that may be used to verify whether the terminal device has a permission to connect to the wireless access point requested by the terminal device.

In practice, the terminal device may be integrated with a blockchain wallet. In this way, the verification information may include a to-be-verified private key signature. The to-be-verified private key signature may be a private key signature corresponding to an address of the blockchain wallet integrated by the terminal device, that is, the private key signature obtained by encrypting, by using a private key, the address of the blockchain wallet integrated by the terminal device. Optionally, the verification information may also include pending payment information. The pending payment information may be information about blockchain tokens to be paid by a terminal device connected to the wireless access point. Blockchain tokens may include but are not limited to Bitcoins, Ethereums, and the like. In a special case, if the connection to the wireless access point does not require payment of blockchain tokens, the verification information may not include the pending payment information, or the amount of blockchain tokens to be paid in the pending payment information is zero. Generally, if the connection to the wireless access point requires payment of blockchain tokens, the verification information may also include payment data. The payment data may be blockchain tokens to be paid by the terminal device connected to the wireless access point.

Step 204. Generate a verification result based on the verification information.

In this embodiment, the router may analyze the verification information to generate the verification result used for indicating whether the verification is successful. Because the router is a node in the blockchain, the verification information can be verified only by using the router, or the verification information may alternatively be verified by using both the router and other nodes in the blockchain in which the router is located. The specific operation of verifying the verification information by the router is basically the same as that of verifying the verification information by the other nodes in the blockchain.

In some optional implementations of this embodiment, in the case of verifying the verification information only by using the router, the router may first decrypt the to-be-verified private key signature by using a public key, to obtain a decryption result. The verification information may include the to-be-verified private key signature, and the to-be-verified private key signature may be the private key signature corresponding to the address of the blockchain wallet integrated by the terminal device. The public key may be a public key corresponding to the address of the blockchain wallet integrated by the terminal device. In practice, when the to-be-verified private key signature is decrypted by using the public key, the address of the blockchain wallet integrated by the terminal device can be decrypted, so that the router has a right to obtain blockchain tokens from the address of the blockchain wallet integrated by the terminal device. Then, the router may generate a verification result based on the decryption result. For example, if the decryption result includes the address of the blockchain wallet integrated by the terminal device, the verification result indicates that the verification is successful, and otherwise, the verification result indicates that the verification fails.

In addition, the verification information may also include the pending payment information. In this way, after decrypting the address of the blockchain wallet integrated by the terminal device, the router may also verify the pending payment information by using preset to-be-received information. Specifically, the router may determine whether the to-be-received information matches the pending payment information. For example, the router determines whether the amount of blockchain tokens in the to-be-received information is equal to the amount of blockchain tokens in the pending payment information. If the amount of blockchain tokens in the to-be-received information is equal to the amount of blockchain tokens in the pending payment information, the to-be-received information matches the pending payment information, and the verification result indicates that the verification is successful, and otherwise, the to-be-received information does not match the pending payment information, and the result indicates that the verification fails. The pending payment information may be information about blockchain tokens to be paid by a terminal device connected to the wireless access point. The to-be-received information may be information about blockchain tokens that the router needs to acquire from the terminal device connected to the wireless access point.

In some optional implementations of this embodiment, in the case of verifying the verification information by using both the router and the other nodes in the blockchain in which the router is located, the router may first verify the verification information, to obtain a first verification result. In a case that the first verification result indicates that the verification fails, the process may be directly ended. In a case that the first verification result indicates that the verification is successful, the verification information may be broadcasted to the other nodes in the blockchain, so that the other nodes in the blockchain verify the verification information. Specifically, for each node in the other nodes in the blockchain, the node may verify the verification information, to obtain a second verification result. Generally, if the second verification result indicates that the verification is successful, the node may send confirmation information to the router, and if the second verification result indicates that the verification fails, the node does not send any information to the router. Therefore, the router may receive confirmation information sent by at least some of the other nodes in the blockchain. In this way, the router can generate a verification result according to the quantity of received confirmation information. If the quantity of the received confirmation information exceeds a preset quantity (for example, three), the verification result indicates that the verification is successful, and if the quantity of the received confirmation information does not exceed the preset quantity, the verification result indicates that the verification fails. It should be noted that the preset quantity should be less than the quantity of the other nodes in the blockchain.

In some optional implementations of this embodiment, in the case of verifying the verification information by using both the router and the other nodes in the blockchain in which the router is located, the router may first verify the verification information, to obtain a first verification result. In a case that the first verification result indicates that the verification fails, the process may be directly ended. In a case that the first verification result indicates that the verification is successful, the router may send the verification information to neighbor nodes of the router, so that the neighbor nodes of the router in the blockchain verify the verification information. Because the router can learn addresses of the neighbor nodes, the router may directly send the verification information to the neighbor nodes instead of sending the verification information through broadcast. Specifically, for each neighbor node of the router, the neighbor node may verify the verification information, to obtain a third verification result. Generally, if the third verification result indicates that the verification is successful, the neighbor node may send the confirmation information to the router, and if the third verification result indicates that the verification fails, the neighbor node does not send any information to the router. Therefore, the router may receive confirmation information sent by at least some of the neighbor nodes. In this way, the router can generate a verification result according to the quantity of received confirmation information. If the quantity of the received confirmation information exceeds a preset quantity, the verification result indicates that the verification is successful, and if the quantity of the received confirmation information does not exceed the preset quantity, the verification result indicates that the verification fails. Because the router is relatively close to the neighbor nodes, the transmission time of verification information and confirmation information is reduced, and the verification speed is improved. It should be noted that the preset quantity should be less than the quantity of the neighbor nodes of the router.

Step 204. If the verification result indicates that verification is successful, grant the terminal device a permission to connect to the wireless access point.

In this embodiment, in a case that the verification result indicates that the verification is successful, the router may grant the terminal device a permission to connect to the wireless access point, so that the terminal device may connect to the wireless access point requested by the terminal device.

In some optional implementations of this embodiment, when the verification information further includes the payment data, if the verification result indicates that the verification is successful, the router may also write in the payment data, and simultaneously synchronize the payment data to the other nodes in the blockchain, so that the terminal device completes the payment. Only after successful payment, the terminal device is granted a permission to connect to the wireless access point. The payment data may be blockchain tokens to be paid by the terminal device connected to the wireless access point.

In some optional implementations of this embodiment, the wireless access point may be a web authentication wireless access point, and an identity of a user is authenticated by using a method for connecting to a wireless access point provided in the embodiments of the present application in place of a web authentication connection method. The authentication process of the method for connecting to a wireless access point provided in the embodiments of the present application does not require the user to manually input any information, so that the method for connecting to a wireless access point provided in the embodiments of the present application can better provide wireless access services for the user. At the same time, providers of wireless access points may further earn blockchain tokens as rewards.

It should be noted that, because the terminal device can interact with the router without being connected to a data network, the authentication on an identity of a user can be completed by using the method for connecting to a wireless access point provided in the embodiments of the present application without requiring the terminal device to connect to the data network.

Figure 3:
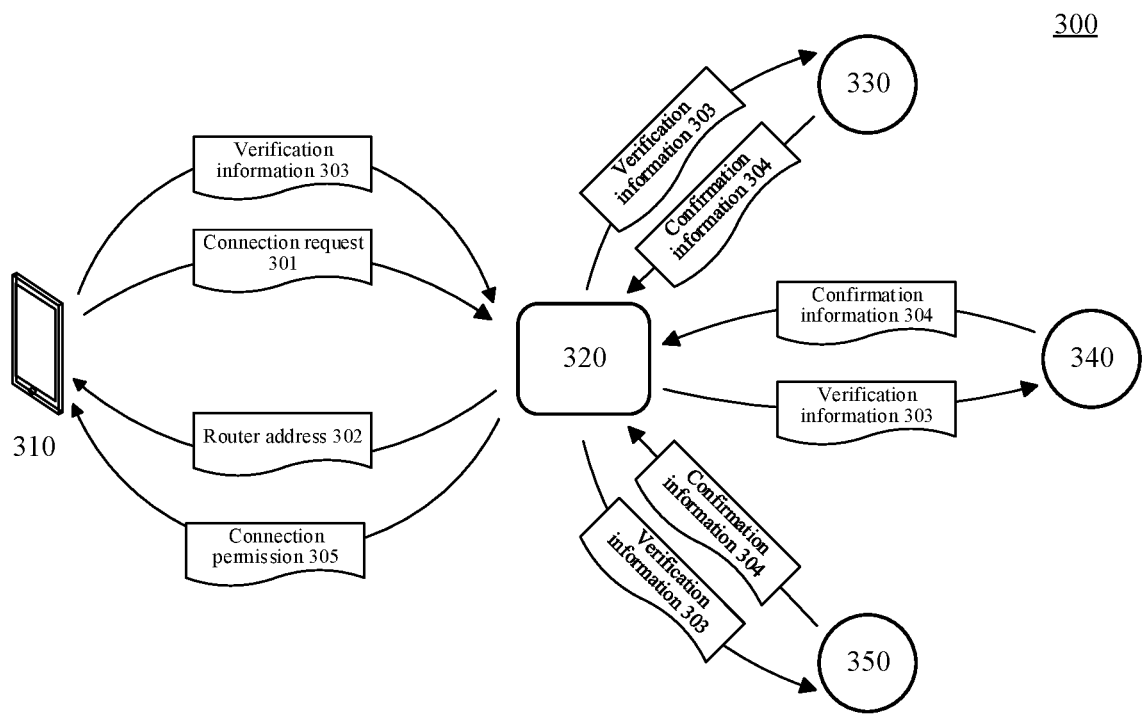
FIG. 3 is a schematic diagram of an application scenario of the method for connecting to a wireless access point provided in FIG. 2.

FIG. 3 shows a schematic diagram of an application scenario of the method for connecting to a wireless access point provided in FIG. 2. In the application scenario of FIG. 3, when a user clicks/taps a wireless access point in a wireless access point list displayed on the screen interface of a terminal device 310, the terminal device 310 may send a request 301 for connecting to the wireless access point to a router 320. Upon receiving the connection request 301, the router 320 may send an address of a node to which the router 320 in a blockchain belongs as a router address 302 to the terminal device 310. In a case that the router address 302 is received, the terminal device 310 may send verification information 303 to the router address 302, so that the router 320 can receive the verification information 303 and verify the verification information 303. In a case that the verification is successful, the router 320 may broadcast the verification information 303 to other nodes 330, 340, and 350 in the blockchain, so that the other nodes 330, 340, and 350 in the blockchain verify the verification information 303. In a case that the verification is successful, the other nodes 330, 340, and 350 in the blockchain may send confirmation information 304 to the router 320. If the router 320 receives two or more pieces of confirmation information, a verification result indicates that the verification is successful. In this case, the router 320 may write in the payment data in the verification information 303, and simultaneously synchronize the payment data to the other nodes 330, 340, and 350 in the blockchain, so that the terminal device 310 completes the payment. After the payment is successful, the router 320 may grant the terminal device 310 a permission 305 to connect to the wireless access point. After obtaining the connection permission 305, the terminal device 310 may connect to the wireless access point.

In the method for connecting to a wireless access point provided in this embodiment of the present application, a router is a node in a blockchain. Therefore, after a request for connecting to a wireless access point sent by a terminal device is received, an address of a node to which the router in the blockchain belongs is sent to the terminal device; then, verification information sent by the terminal device to the address of the node to which the router in the blockchain belongs is received; next, a verification result is generated based on the verification information; and if the verification result indicates that the verification is successful, the terminal device is granted a permission to connect to the wireless access point, so that the terminal device can successfully connect to the wireless access point. A router is used as a node in a blockchain to verify verification information in the blockchain, and whether to grant a terminal device a permission to connect to a wireless access point is determined according to a verification result, so that a new method for connecting to a wireless access point is provided, enriching methods for connecting to a wireless access point.

Figure 4:
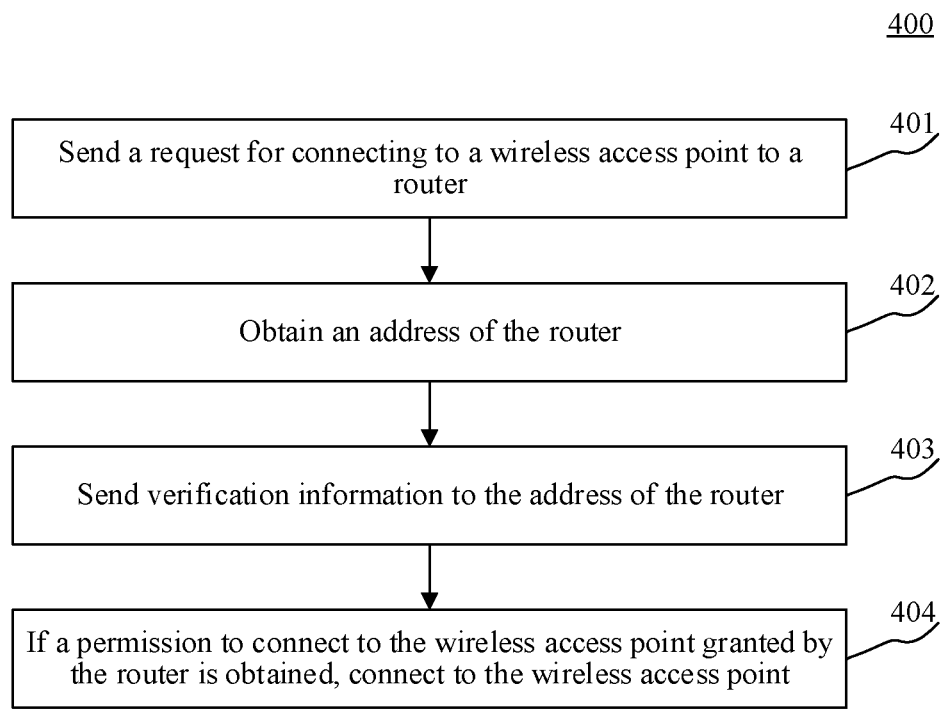
FIG. 4 is a flowchart of another embodiment of a method for connecting to a wireless access point according to the present application.

FIG. 4 shows a process 400 of a method for connecting to a wireless access point according to another embodiment of the present application. The method for connecting to a wireless access point is applied to a terminal device and includes the following steps.

Step 401. Send a request for connecting to a wireless access point to a router.

In this embodiment, the terminal device (such as the terminal device 101 shown in FIG. 1) on which the method for connecting to a wireless access point runs may send the request for connecting to a wireless access point to the router (such as the router 102 shown in FIG. 1).

In practice, when a user opens a WLAN option in the settings of the terminal device or runs a wireless access point connection application installed on the terminal device, a screen interface of the terminal device may display a list of wireless access points near the terminal device. When the user clicks/taps a wireless access point in the list, the terminal device may be triggered to send a request for connecting to the wireless access point to the router.

Step 402: Obtain an address of the router.

In this embodiment, the terminal device may obtain the address of the router. The router may be a node in a blockchain, and the address of the router is actually an address of a node to which the router in the blockchain belongs.

In some optional implementations of this embodiment, the terminal device obtains the address of the router by remotely calling a service interface. The remotely called service interface may be, for example, a JSON-RPC interface. JSON-RPC is a remote call service by using JSON as a protocol, and JSON is a lightweight data interchange format.

Step 403. Send verification information to the address of the router.

In this embodiment, the terminal device may send the verification information to the address of the router, so that the router can receive the verification information. Subsequently, the router may analyze the verification information to determine whether the terminal device has a permission to connect to the wireless access point requested by the terminal device. Generally, if the terminal device has the permission to connect to the wireless access point requested by the terminal device, the router may grant the terminal device a permission to connect to the wireless access point; and otherwise, the router does not grant the terminal device a permission to connect to the wireless access point. The verification information is information that may be used to verify whether the terminal device has the permission to connect to the wireless access point requested by the terminal device. Because the router is a node in the blockchain, the verification information can be verified only by using the router, or the verification information may alternatively be verified by using both the router and other nodes in the blockchain in which the router is located. The specific operation of verifying the verification information by the router is basically the same as that of verifying the verification information by the other nodes in the blockchain.

In practice, the terminal device may be integrated with a blockchain wallet. In this way, the verification information may include a to-be-verified private key signature. The to-be-verified private key signature may be a private key signature corresponding to an address of the blockchain wallet integrated by the terminal device, that is, the private key signature obtained by encrypting, by using a private key, the address of the blockchain wallet integrated by the terminal device. Optionally, the verification information may also include pending payment information. The pending payment information may be information about blockchain tokens to be paid by a terminal device connected to the wireless access point. Blockchain tokens may include but are not limited to Bitcoins, Ethereums, and the like. In a special case, if the connection to the wireless access point does not require payment of blockchain tokens, the verification information may not include the pending payment information, or the amount of blockchain tokens to be paid in the pending payment information is zero. Generally, if the connection to the wireless access point requires payment of blockchain tokens, the verification information may also include payment data. The payment data may be blockchain tokens to be paid by the terminal device connected to the wireless access point.

In some optional implementations of this embodiment, the verification information may include a to-be-verified private key signature. In this way, after obtaining the address of the router, the terminal device may display a payment page including the address of the router. In the case of receiving a confirmation operation on the payment page including the address of the router, the terminal device may send verification information including the to-be-verified private key signature to the address of the router. Generally, a confirmation button and a cancel button may be set on the payment page. When a user clicks/taps the confirmation button, the terminal device may send the verification information to the address of the router. When the user clicks/taps the cancel button, the payment page is closed and this connection is abandoned.

In addition, the verification information may also include the pending payment information. In this way, when obtaining the address of the router, the terminal device may also obtain preset to-be-received information from the router. The pending payment information may be information about blockchain tokens to be paid by the terminal device connected to the wireless access point, and the to-be-received information may be information about blockchain tokens that the router needs to acquire from the terminal device connected to the wireless access point. In this way, the terminal device may display a payment page including the address of the router and the to-be-received information. In the case of receiving a confirmation operation on the payment page including the address of the router and the to-be-received information, the terminal device may send the verification information including the to-be-verified private key signature and the pending payment information to the address of the router.

In addition, the verification information may further include payment data. In this way, in the case of receiving the confirmation operation on the payment page including the address of the router and the to-be-received information, the terminal device may send verification information including the to-be-verified private key signature, the pending payment information and the payment data to the address of the router. The payment data may be blockchain tokens to be paid by the terminal device connected to the wireless access point.

Figure 5:
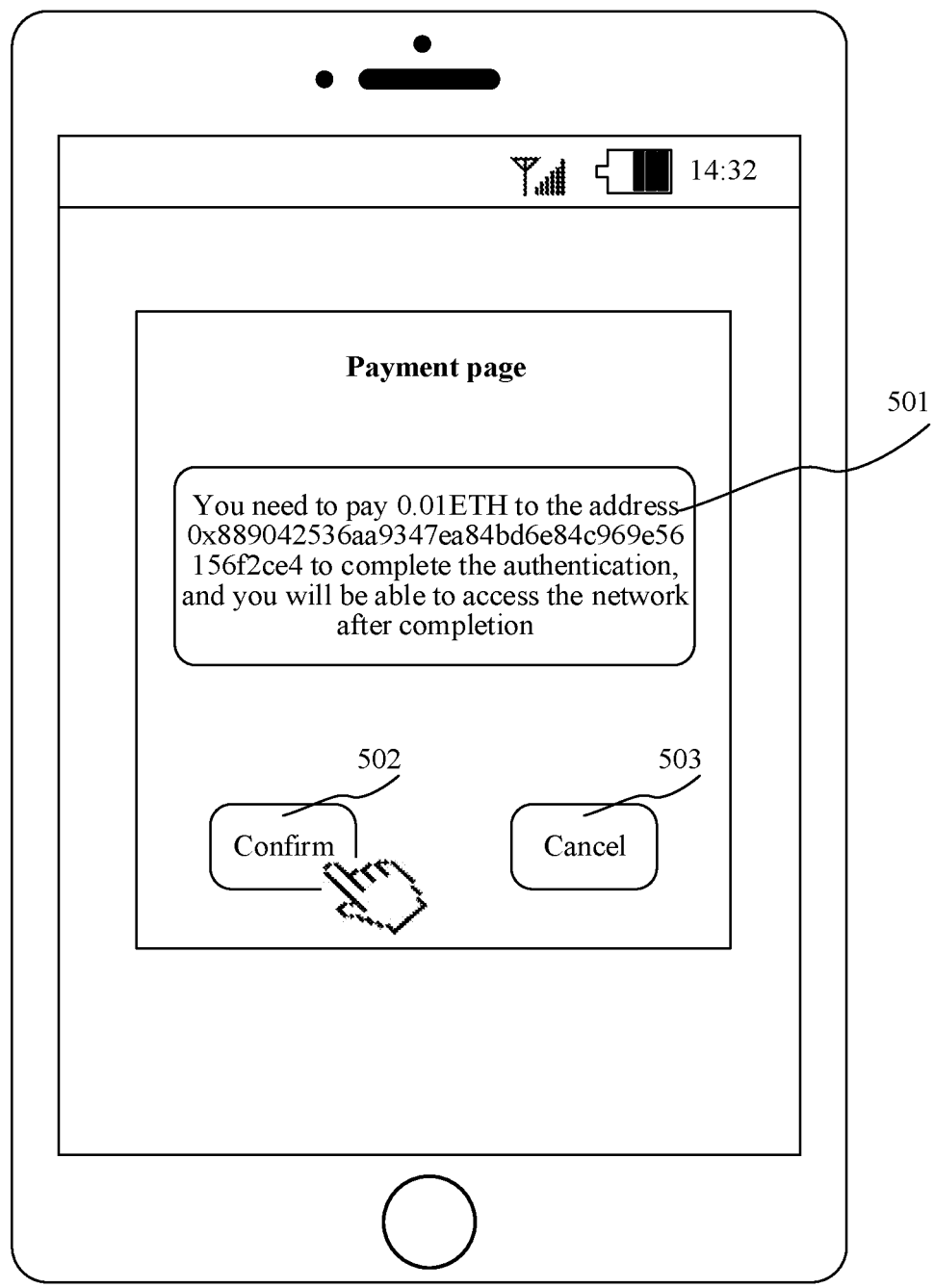
FIG. 5 is a schematic diagram of a payment page displayed on a terminal device.

FIG. 5 shows a schematic diagram of a payment page displayed on a terminal device. After the terminal device sends a request for connecting to a wireless access point to a router, the terminal device may obtain an address "0x889042536aa9347ea84bd6e84c969e56156f2ce4" of a node to which the router in the blockchain belongs and an amount "0.01ETH" of blockchain tokens to be paid for this connection. At this time, a screen interface of the terminal device may display a payment page including the address of the node to which the router in the blockchain belongs and the amount of blockchain tokens to be paid for this connection. The payment page may be shown as 501, showing information that "You need to pay 0.01ETH to the address 0x889042536aa9347ea84bd6e84c969e56156f2ce4 to complete the authentication, and you will be able to access the network after completion". The payment page may also be provided with a confirmation button and a cancel button, where the confirmation button may be shown as 502, and the cancel button may be shown as 503. When the user clicks/taps the confirmation button, the terminal device may send the verification information to an address of the router. When the user clicks/taps the cancel button, the payment page is closed and this connection is abandoned.

Step 404. If the permission to connect to the wireless access point granted by the router is obtained, connect to the wireless access point.

In this embodiment, in a case that the permission to connect to the wireless access point granted by the router is obtained, the terminal device may connect to the wireless access point requested by the terminal device.

In some optional implementations of this embodiment, the wireless access point may be a web authentication wireless access point, and an identity of a user is authenticated by using a method for connecting to a wireless access point provided in the embodiments of the present application in place of a web authentication connection method. The authentication process of the method for connecting to a wireless access point provided in the embodiments of the present application does not require the user to manually input any information, so that the method for connecting to a wireless access point provided in the embodiments of the present application can better provide wireless access services for the user. At the same time, providers of wireless access points may further earn blockchain tokens as rewards.

It should be noted that, because the terminal device can interact with the router without being connected to a data network, the authentication on an identity of a user can be completed by using the method for connecting to a wireless access point provided in the embodiments of the present application without requiring the terminal device to connect to the data network.

In the method for connecting to a wireless access point provided in this embodiment of the present application, the router is a node in the blockchain, after the request for connecting to the wireless access point to the router is sent, the address of the node to which the router in the blockchain belongs may be obtained, and then the verification information is sent to the address of the node to which the router in the blockchain belongs; and in a case that the permission to connect to the wireless access point granted by the router is obtained, the wireless access point may be connected. A router is used as a node in a blockchain to verify verification information in the blockchain, and whether to grant a terminal device a permission to connect to a wireless access point is determined according to a verification result, so that a new method for connecting to a wireless access point is provided, enriching methods for connecting to a wireless access point.

Figure 6:
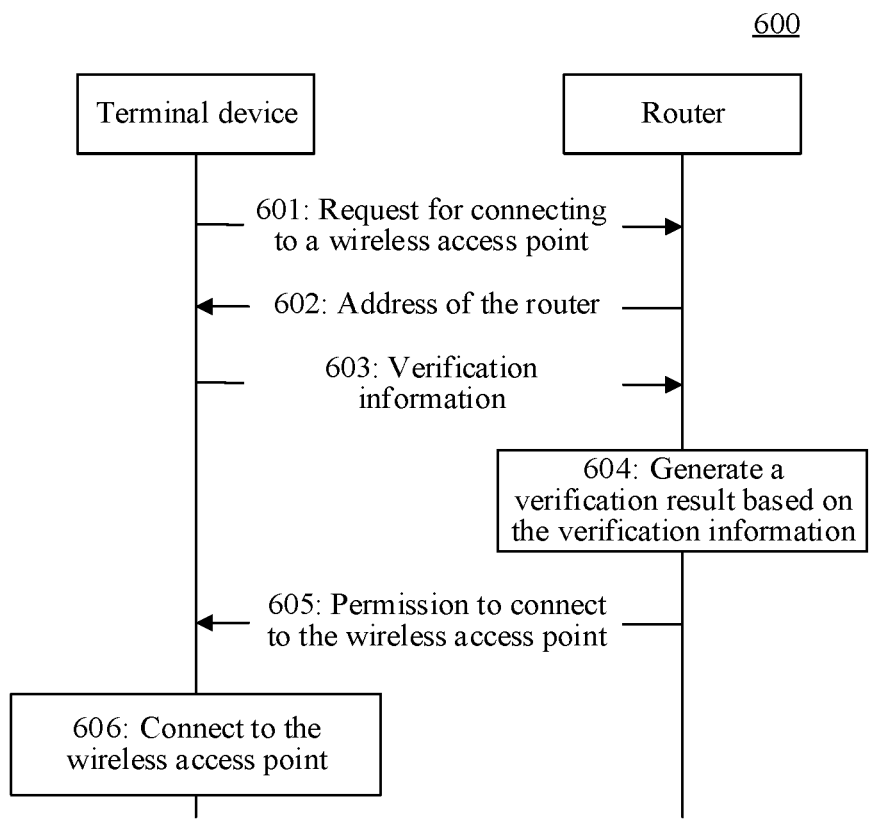
FIG. 6 is a sequence diagram of still another embodiment of a method for connecting to a wireless access point according to the present application.

FIG. 6 shows a sequence 600 of still another embodiment of a method for connecting to a wireless access point according to the present application. The method for connecting to a wireless access point includes the following steps.

Step 601. A terminal device sends a request for connecting to a wireless access point connection to a router.

In this embodiment, the terminal device (for example, the terminal device 101 shown in FIG. 1) may send the request for connecting to a wireless access point to the router (for example, the router 102 shown in FIG. 1).

In practice, when a user opens a WLAN option in the settings of the terminal device or runs a wireless access point connection application installed on the terminal device, a screen interface of the terminal device may display a list of wireless access points near the terminal device. When the user clicks/taps a wireless access point in the list, the terminal device may be triggered to send a request for connecting to the wireless access point to the router.

Step 602. The terminal device obtains an address of the router.

In this embodiment, the terminal device may obtain the address of the router. The router may be a node in a blockchain, and the address of the router is actually an address of a node to which the router in the blockchain belongs.

Step 603. The terminal device sends verification information to the address of the router.

In this embodiment, the terminal device may send the verification information to the address of the router, so that the router can receive the verification information. Generally, the verification information is information that may be used to verify whether the terminal device has a permission to connect to the wireless access point requested by the terminal device.

In practice, the terminal device may be integrated with a blockchain wallet. Generally, the verification information may include a to-be-verified private key signature. The to-be-verified private key signature may be a private key signature corresponding to an address of the blockchain wallet integrated by the terminal device, that is, the private key signature obtained by encrypting, by using a private key, the address of the blockchain wallet integrated by the terminal device. Optionally, the verification information may also include pending payment information. The pending payment information may be information about blockchain tokens to be paid by a terminal device connected to the wireless access point. Blockchain tokens may include but are not limited to Bitcoins, Ethereums, and the like. In a special case, if the connection to the wireless access point does not require payment of blockchain tokens, the verification information may not include the pending payment information, or the amount of blockchain tokens to be paid in the pending payment information is zero. Generally, if the connection to the wireless access point requires payment of blockchain tokens, the verification information may also include payment data. The payment data may be blockchain tokens to be paid by the terminal device connected to the wireless access point.

Step 604. The router generates a verification result based on the verification information.

In this embodiment, the router may analyze the verification information to generate the verification result used for indicating whether the verification is successful. Because the router is a node in the blockchain, the verification information can be verified only by using the router, or the verification information may alternatively be verified by using both the router and other nodes in the blockchain in which the router is located. The specific operation of verifying the verification information by the router is basically the same as that of verifying the verification information by the other nodes in the blockchain.

Step 605. If the verification result indicates that the verification is successful, the router grants the terminal device a permission to connect to the wireless access point.

In this embodiment, in a case that the verification result indicates that the verification is successful, the router may grant the terminal device a permission to connect to the wireless access point. Optionally, if the verification result indicates that the verification is successful, the router may first write in the payment data, and simultaneously synchronize the payment data to other nodes in the blockchain, so that the terminal device completes the payment. Only after successful payment, the terminal device is granted a permission to connect to the wireless access point. The payment data may be blockchain tokens to be paid by the terminal device connected to the wireless access point.

Step 606. The terminal device connects to the wireless access point.

In this embodiment, in a case that the permission to connect to the wireless access point granted by the router is obtained, the terminal device may connect to the wireless access point requested by the terminal device.

In the method for connecting to a wireless access point provided in this embodiment of the present application, first, after a terminal device sends a request for connecting to a wireless access point to a router, the terminal device may obtain an address of a node to which the router belongs in a blockchain, to send verification information to the address of the node to which the router in the blockchain belongs; then, the router may receive the verification information, and generate a verification result based on the verification information; finally, in a case that the verification result indicates that the verification is successful, the router may grant the terminal device a permission to connect to the wireless access point, so that the terminal device can connect to the wireless access point. A router is used as a node in a blockchain to verify verification information in the blockchain, and whether to grant a terminal device a permission to connect to a wireless access point is determined according to a verification result, so that a new method for connecting to a wireless access point is provided, enriching methods for connecting to a wireless access point.

Figure 7:
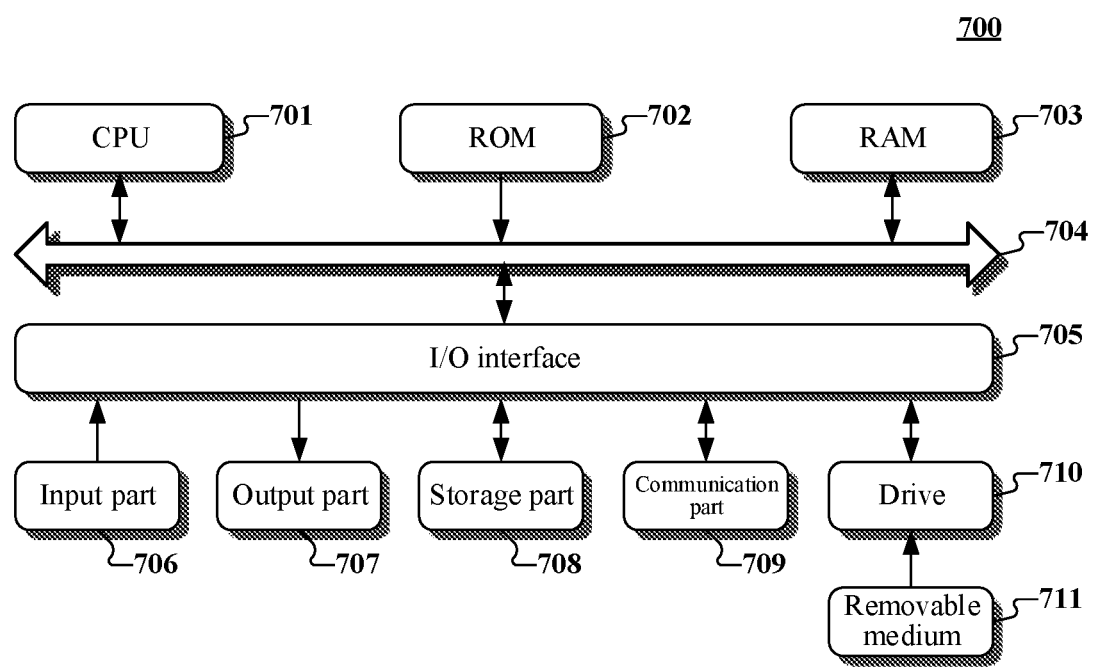
FIG. 7 is a schematic structural diagram of a computer system adapted to implement a router or a terminal device according to an embodiment of the present application.

FIG. 7 is a schematic structural diagram of a computer system 700 adapted to implement a router or a terminal device according to an embodiment of the present application. The router or the terminal device shown in FIG. 7 is merely an example, and should not impose any limitation on functions and a use scope of the embodiments of the present application.

As shown in FIG. 7, the computer system 700 includes a central processing unit (CPU) 701. The CPU 701 can perform a plurality of appropriate actions and processing according to a program stored in a read-only memory (ROM) 702 or a program loaded into a random access memory (RAM) 703 from a storage part 708. In the RAM 703, various programs and data that are required for operations of the system 700 are further stored. The CPU 701, the ROM 702, and the RAM 703 are connected to each other through a bus 704. An input/output (I/O) interface 705 is also connected to the bus 704.

Components connected to the I/O interface 705 are as follows: an input part 706 including a keyboard, a mouse or the like; an output part 707 including a cathode ray tube (CRT), a liquid crystal display (LCD), a speaker or the like; a storage part 708 including a hard disk or the like; and a communication part 709 of a network interface card, including a LAN card, a modem or the like. The communication part 709 performs communication processing via a network such as the Internet. A drive 710 is also connected to the I/O interface 705 as required. A removable medium 711 such as a magnetic disk, an optical disc, a magneto-optical disk, or a semiconductor memory is installed on the drive 710 as required, so that a computer program read from the removable medium 711 is installed into the storage part 708 as required.

In particular, according to the embodiments of the present disclosure, the processes described above with reference to the flowchart may be implemented as a computer software program. For example, the embodiments of the present disclosure include a computer program product, including a computer program carried on a computer-readable medium. The computer program includes program code for performing the method shown in the flowchart. In such an embodiment, the computer program may be downloaded and installed through the communication part 709 from a network, and/or installed from the removable medium 711. When the computer program is executed by the central processing unit (CPU) 701, the foregoing functions defined in the method of the present application are performed. It should be noted that, the computer-readable medium shown in the present application may be a computer-readable signal medium, a computer-readable medium, or any combination of the two. The computer-readable medium may be, for example, but not limited to, an electric, magnetic, optical, electromagnetic, infrared, or semi-conductive system, apparatus, or device, or any combination thereof. A more specific example of the computer-readable medium may include, but not limited to: an electrical connection having one or more wires, a portable computer magnetic disk, a hard disk, a RAM, a ROM, an erasable programmable read-only memory (EPROM or flash memory), an optical fiber, a portable compact disk read-only memory (CD-ROM), an optical storage device, a magnetic storage device, or any appropriate combination thereof. In the present application, the computer-readable medium may be any tangible medium containing or storing a program, and the program may be used by or used in combination with an instruction execution system, apparatus, or device. In the present application, a computer-readable signal medium may include a data signal that is in a baseband or propagated as a part of a carrier, the data signal carrying computer-readable program code. Such a propagated data signal may be in a plurality of forms, including but not limited to an electromagnetic signal, an optical signal, or any suitable combination thereof. The computer-readable signal medium may alternatively be any computer-readable medium in addition to a computer-readable medium. The computer-readable medium may send, propagate, or transmit a program that is used by or used in conjunction with an instruction execution system, apparatus, or device. The program code contained in the computer-readable medium may be transmitted by using any appropriate medium, including but not limited to: a wireless medium, a wire, an optical cable, RF, any suitable combination thereof, or the like.

One or more programming languages or any combination thereof may be used to write the computer program code used for performing the operations in the present application. The programming languages include, but are not limited to an object oriented programming language such as Java, Smalltalk, C++, or the like and a conventional procedural programming language, such as the C programming language or a similar programming language. The program code may be executed entirely on a computer of a user, partly on the computer of the user, as a stand-alone software package, partly on the computer of the user and partly on a remote computer, or entirely on the remote computer or a server. For the case involving a remote computer, the remote computer may be connected to a computer of a user through any type of network including a local area network (LAN) or a wide area network (WAN), or may be connected to an external computer (for example, through the Internet by using an Internet service provider).

The flowcharts and block diagrams in the accompanying drawings illustrate possible system architectures, functions and operations that may be implemented by a system, a method, and a computer program product according to various embodiments of the present application. In this regard, each block in the flowchart or the block diagram may represent a module, a program segment, or a part of code. The module, the program segment, or the part of the code includes one or more executable instructions for implementing a specified logical function. It should also be noted that, in some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It should also be noted that, each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

According to another aspect, the present application further provides a computer-readable medium. The computer-readable medium may be included in the router and the terminal device described in the foregoing embodiments, or may exist alone and is not disposed in the router or the terminal device. The foregoing computer-readable medium carries one or more programs. When executed by the router or the terminal device, the foregoing one or more programs cause the router to: receive a request for connecting to a wireless access point sent by a terminal device, and send an address of the router to the terminal device, the router being a node in a blockchain, and the address of the router being an address of the node to which the router in the blockchain belongs; receive verification information sent by the terminal device to the address of the router; generate a verification result based on the verification information; and if the verification result indicates that the verification is successful, grant the terminal device a permission to connect to the wireless access point. Alternatively, the foregoing one or more programs cause the terminal device to: send a request for connecting to a wireless access point to a router, the router being a node in a blockchain; obtain an address of the router; send verification information to the address of the router; and if a permission to connect to the wireless access point granted by the router is obtained, connect to the wireless access point.

The foregoing descriptions are merely exemplary embodiments of the present application and explanations of the applied technical principles. A person skilled in the art should understand that the scope of the invention in the present application is not limited to technical solutions formed by specific combinations of the foregoing technical features, and further includes other technical solutions formed by any combination of the foregoing technical features or equivalent features without departing from the inventive concept. For example, technical solutions formed by replacing the foregoing features with technical features disclosed in the present application and (but not limited to) having similar functions.

What is claimed is:

1. A method for connecting to a wireless access point, applied to a router, and comprising:
 receiving a request for connecting to the wireless access point, where the request is sent by a terminal device;
 sending an address of the router to the terminal device, wherein the router is a node in a blockchain, and the address of the router is an address of the node to which the router in the blockchain belongs;

receiving verification information sent by the terminal device to the address of the router, wherein the verification information comprises pending payment information indicating a type of a blockchain token and an amount of the blockchain token to be paid by the terminal device for connecting to the wireless access point;

generating a verification result based on the verification information; and if the verification result indicates that a verification is successful, granting the terminal device a permission to connect to the wireless access point.

2. The method according to claim 1, wherein the verification information comprises a to-be-verified private key signature; and the step of generating the verification result based on the verification information comprises:

decrypting, with a public key, a to-be-verified private key signature to obtain a decryption result; and generating the verification result based on the decryption result.

3. The method according to claim 2, wherein the verification information further comprises pending payment information; and the step of generating the verification result based on the decryption result comprises:

if the decryption result comprises an address of the terminal device, verifying the pending payment information by using preset to-be-received information, to generate the verification result.

4. The method according to claim 1, wherein the step of generating the verification result based on the verification information comprises:

verifying the verification information, to obtain a first verification result;

if the first verification result indicates that the verification is successful, broadcasting the verification information to other nodes in the blockchain;

receiving confirmation information sent by at least some of the other nodes in the blockchain; and generating the verification result according to a quantity of received confirmation information, wherein if the quantity of the received confirmation information exceeds a preset quantity, the verification result indicates that the verification is successful, and if the quantity of the received confirmation information does not exceed the preset quantity, the verification result indicates that the verification fails.

5. The method according to claim 4, wherein the verification information further comprises payment data; and before the step of granting the terminal device the permission to connect to the wireless access point, the method further comprises:

writing the payment data, and synchronizing the payment data to the other nodes in the blockchain.

6. The method according to claim 1, wherein the step of generating the verification result based on the verification information comprises:

verifying the verification information, to obtain a first verification result;

if the first verification result indicates that the verification is successful, sending the verification information to neighboring nodes of the router;

receiving confirmation information sent by at least some of the neighboring nodes of the router; and generating the verification result according to a quantity of received confirmation information, wherein if the quantity of the received confirmation information exceeds a preset quantity, the verification result indicates that the verification is successful, and if the quantity of the received confirmation information does not exceed the preset quantity, the verification result indicates that the verification fails.

7. The method according to claim 1, wherein the wireless access point is a web authentication wireless access point.

8. A method for connecting to a wireless access point, applied to a terminal device, and comprising:

sending a request for connecting to the wireless access point to a router;

obtaining an address of the router, wherein the router is a node in a blockchain, and the address of the router is an address of the node to which the router in the blockchain belongs;

sending verification information to the address of the router, wherein the verification information comprises pending payment information indicating a type of a blockchain token and an amount of the blockchain token to be paid by the terminal device for connecting to the wireless access point; and if a permission to connect to the wireless access point granted by the router is obtained, connecting to the wireless access point.

9. The method according to claim 8, wherein the step of obtaining the address of the router comprises:

obtaining the address of the router by remotely calling a service interface.

10. The method according to claim 8, wherein the verification information comprises a to-be-verified private key signature; and after obtaining the address of the router, the method further comprises:

displaying a payment page comprising the address of the router; and the step of sending verification information to the address of the router comprises:

in response to receiving a confirmation operation on the payment page comprising the address of the router, sending the verification information comprising the to-be-verified private key signature to the address of the router.

11. The method according to claim 10, wherein the verification information further comprises pending payment information; and during the step of obtaining of the address of the router, the method further comprises:

obtaining preset to-be-received information from the router;

the step of displaying the payment page comprising the address of the router comprises:

displaying the payment page comprising the address of the router and the to-be-received information; and the step of sending verification information to the address of the router comprises:

in response to receiving the confirmation operation on the payment page comprising the address of the router and the to-be-received information, sending the verification information comprising the to-be-verified private key signature and the pending payment information to the address of the router.

12. The method according to claim 11, wherein the verification information further comprises payment data; and the step of sending verification information to the address of the router comprises:

in response to receiving the confirmation operation on the payment page comprising the address of the router and the to-be-received information, sending the verification information comprising the to-be-verified private key signature, the pending payment information and the payment data to the address of the router.

13. The method according to claim 8, wherein the wireless access point is a web authentication wireless access point.

14. A router, comprising:
one or more processors; and
a storage apparatus, configured to store one or more programs;
wherein the one or more programs, when executed by the one or more processors, cause the one or more processors to implement the following operations:
receiving a request for connecting to a wireless access point, wherein the request is sent by a terminal device;
sending an address of the router to the terminal device, wherein the router is a node in a blockchain, and the address of the router is an address of the node to which the router in the blockchain belongs;
receiving verification information sent by the terminal device to the address of the router, wherein the verification information comprises pending payment information indicating a type of a blockchain token and an amount of the blockchain token to be paid by the terminal device for connecting to the wireless access point;
generating a verification result based on the verification information; and
if the verification result indicates that a verification is successful, granting the terminal device a permission to connect to the wireless access point.

* * * * *